3,397,615
Patented Aug. 20, 1968

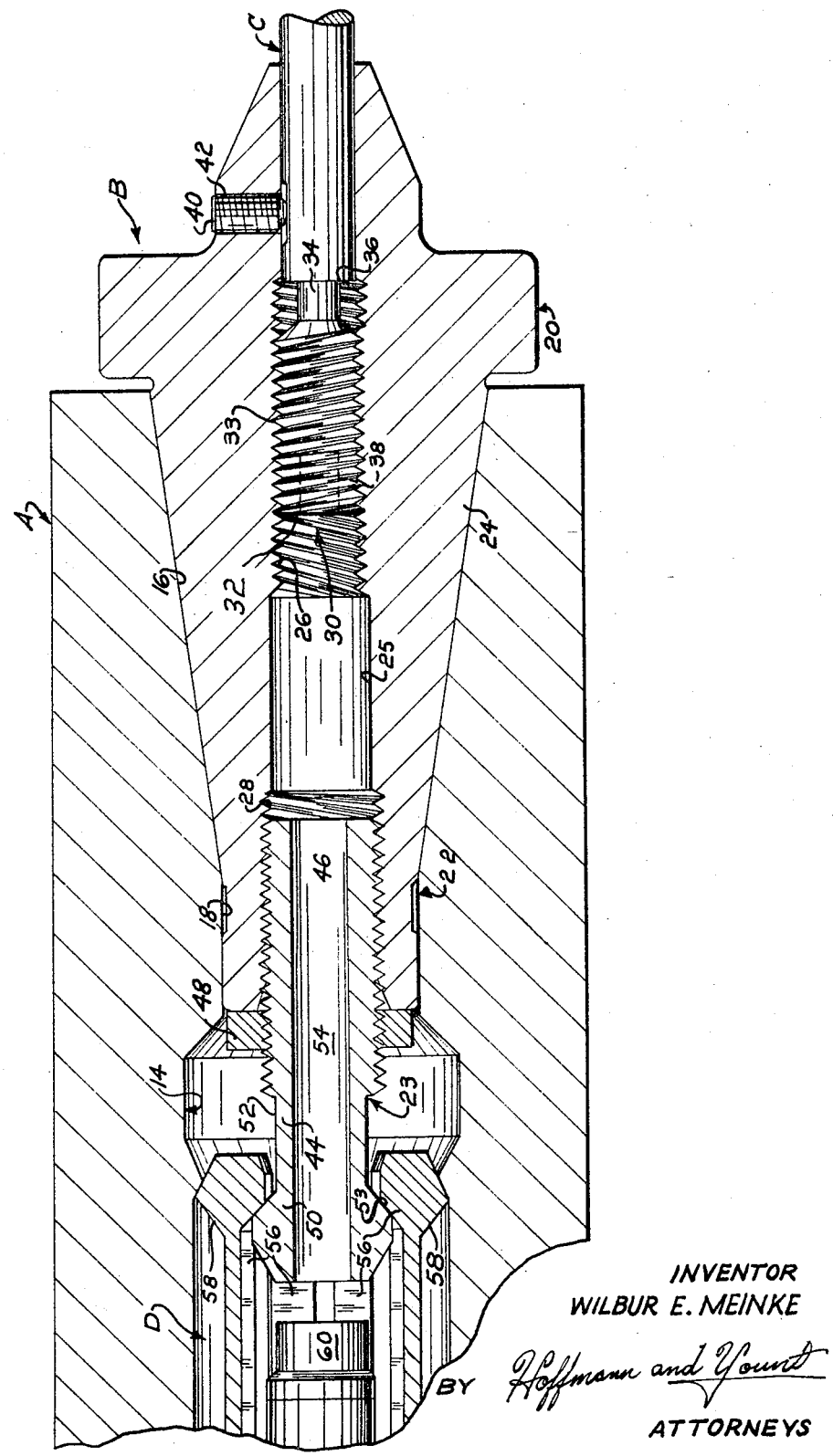

3,397,615
TOOL ARBOR
Wilbur E. Meinke, Fairview Park, Ohio, assignor to The New Britain Machine Company, New Britain, Conn., a corporation of Connecticut
Filed Feb. 28, 1966, Ser. No. 530,291
5 Claims. (Cl. 90—11)

ABSTRACT OF THE DISCLOSURE

In a tool arbor having a tool attachable end adapted to support a work tool and a spindle attaching end adapted to be engaged by a draw back mechanism within a tool spindle, structure defining an unobstructed aperture extending axially through the arbor for permitting a driving tool to be inserted into the aperture from the spindle attaching end of the arbor and engaged with an adjustable tool abutment member mounted in the aperture.

---

The present invention relates to machine tools having rotating tool spindles and more particularly relates to tool arbors for use with many such machines to connect the tools to the rotatable tool spindle.

In many machine tools having rotatable tool spindles, the tools are connected to or carried by tool arbors which arbors with their connected tools are interchanged in the tool spindle when it is desired to change tools as distinguished from merely interchanging the tools. In the operation of many such machines, for example a punched tape controlled horizontal boring machine equipped with automatic tool changing apparatus and programmed to automatically perform machining operations such as drilling a hole to a predetermined depth where the tool support or the work support or both move predetermined distances, it is often necessary to initially set or preset the distance which a tool projects from its arbor within relatively close limits or tolerances. It is also desirable to use tool arbors which are standardized as far as possible.

One of the principal objects of the present invention is to provide a new and improved tool arbor adapted to have its one end detachably connected to a spindle of a machine tool and a tool secured to its opposite end and which is constructed and arranged so that the extent that the tool projects from the end of the tool arbor can be adjusted while the tool is in the arbor.

Another object of the invention is the provision of a new and improved tool arbor having a spindle attaching end which is adapted to be engaged by a draw back mechanism in a tool spindle to secure the arbor to the spindle and a tool supporting end which is adapted to receive and secure a tool therein and a central aperture extending axially through the arbor and having a helical cam surface formed along an intermediate portion thereof and which cooperates with a mating cam surface formed on the periphery of an abutment member within the aperture and which is adjustable to define the extent that the tool projects from the forward end of the tool arbor and wherein the abutment member can be adjusted from the spindle attaching end of the arbor through the central aperture so that the tool projection adjustment can be accomplished while the tool is in the arbor.

A still further object of the invention is the provision of a new and improved tool arbor of the character set forth in the preceding object wherein the spindle attaching end comprises a member detachably connected to the arbor body and having external cam surfaces adapted to be engaged by the draw back mechanism and an aperture extending therethrough.

A still further object of the invention is the provision of a novel and improved member adapted to be detachably connected to an arbor member and having an external cam surface engageable by the draw back mechanism of a tool spindle and an axial opening therethrough.

The present invention resides in certain constructions and combinations and arrangements of parts and further objects and advantages thereof will be apparent to those skilled in the art to which the invention relates from the following description of the preferred embodiment described with reference to the accompanying drawing forming a part of the specification and which is a sectional view of a portion of a tool spindle of a machine tool having a tool arbor embodying the present invention secured herein.

While the invention is susceptible of various embodiments and has various applications, it is herein shown and described as embodied in a spindle of the general character shown in United States patents to Stephan No. 3,023,675, issued Mar. 6, 1962.

The tool spindle shown is identified by reference character A and is adapted to be supported in and form a part of a machine tool. The tool spindle A includes a centrally disposed opening or bore 14 extending therethrough. The bore 14 includes a tapered portion 16 at the forward or right-hand end of the tool spindle A, as viewed in the drawings, which converges as it extends toward the left and connects with an intermediate bore portion 18. The bore portions 16 and 18 define a socket or opening which receives a tool arbor B.

The tool arbor B has a forward portion 20 adapted to receive a tool C, an intermediate portion 22 having an outer periphery which conforms to the configuration of bore portions 16 and 18 and a rearward portion 23 engageable by a draw back mechanism D for securing the arbor to the spindle. The tool C is received in the forward or right-hand end portion of a centrally disposed aperture which extends axially through the arbor B. The arbor B shown comprises a body member 24 having a central aperture 25 provided with internal threads 26, 28 formed intermediate its ends and at the left end thereof, respectively. Alternatively, the entire length of the aperture 25 could have internal threads formed therealong.

An abutment member 30 having a body portion 32 provided with external threads 33 along its periphery threadedly engages the intermediate threads 26 and is adjustable axially therealong to adjust the extent tool C projects from arbor B. The abutment member 30 has a head portion 34 of reduced cross-sectional area at the forward end thereof arranged to present a tool abutting face 36 against which the left-hand end of the tool C is adapted to abut and limits the extent that tool C penetrates aperture 25. Varying the depth of penetration of the tool in the arbor aperture sets the extent the tool projects from the forward end of the arbor.

The depth of penetration of the tool shank in aperture 25 is adjusted by rotating member 30 along threads 26 by a manual driving tool such as a wrench. The wrench is received, in the preferred embodiment, in a mating recess 38 formed in the left-hand end of the body 32 of the member 30 as viewed in the drawings. Operation of the driving tool when engaged in recess 38 rotates the abutment member 30 along threads 26 and adjusts the tool projection through contact of the tool abutting face 36 with the end of the tool.

The tool C is secured in the tool arbor B after the desired projection has been set by adjustment of the abutment member 30 by a suitable mechanism which in the preferred embodiment includes a set screw 40 threadedly received in a radially extending threaded opening 42 formed in the forward portion 20 of the tool arbor B. The set screw 40 has a head which is engageable by a driving tool such as a screw driver to turn the set screw 40 in the threaded opening 42 until the lower end thereof engages the shank of the tool C securing the tool in its adjusted position in the tool arbor B.

In the tool arbor B shown, the rearward portion 23 which is the part of the arbor engageable by the draw back mechanism D to secure the arbor to the spindle is formed as a part of a connector member 44 detachably secured to the left end of the body member 24 of the arbor. The member 44 has a threaded end portion 46 which engages the threads 28 in the aperture 25 of the member 24 to assemble the connector member with the arbor proper. The member 44 is assembled with the part 24 prior to assembly of the arbor in the spindle and is locked to the member 24 by a lock nut 48 threaded on the portion 46 and which abuts the end of the member 24 of the arbor. Alternatively, the connector member or part of the arbor could be formed integral with the arbor proper, that is, the member 24, or could be permanently attached thereto such as by welding or the like.

To the left of the threaded end portion 46, the member 44 is provided with a cam head 50 connected thereto by a reduced portion or neck 52. The cam head 50 has external cam surfaces thereon including the surface 53 and is engageable by the draw back mechanism D. The member 44 also includes a centrally disposed aperture or opening 54 which extends axially therethrough and which forms an extension of the aperture 25, when the member 44 is assembled in the aperture. The opening 54 which is co-axial with aperture 25 cooperates with the aperture to provide access to the abutment member 30 for the driving tool so that the abutment member 30 may be adjusted with the tool positioned in the aperture 25 to set the precise extent that the tool projects from the forward end of the arbor.

The draw back mechanism D for locking or securing the arbor B in the socket of the spindle A formed by bore portions 16 and 18 and the cooperating surfaces on the cam head 50 are similar to corresponding parts of the aforesaid patent to Stephan and the details thereof will not be repeated herein. Suffice it to say that the collet 56 is mounted for reciprocation in bore 14 of the spindle A and includes a plurality of spring fingers 58 which are urged into gripping engagement with the cam head 50. Suitable drive means are provided to move the fingers 58 forward to release the head 50. As the fingers are moved to release the head, the forward end of a bar 60 engages the rear face of the head 50 driving the head to the right breaking the contact between the arbor and the spindle. Thereafter, the tool arbor can be readily withdrawn from the tool spindle.

From the foregoing it should be apparent that a new and improved tool arbor has been provided for a rotatable spindle of a machine tool and wherein the extent a tool projects from the tool arbor can be readily adjusted by rotating an abutment member within the arbor by a driving tool inserted through an aperture opening into the end of the tool arbor adapted to be connected to the spindle.

While the preferred form of the invention has been described in considerable detail, it will be apparent that the invention is not limited to the construction shown and it is my intention to hereby cover all adaptations, modifications and changes therein which come within the practice of those skilled in the art to which the invention relates and the scope of the appended claims.

Having described my invention, I claim:

1. A tool arbor adapted for attaching a tool to a tool spindle of a machine, said tool arbor comprising a first member having a tool attachable end adapted to support a tool and a spindle attaching end adapted to be connected to a tool spindle of a machine, said spindle attaching end of said first member having an external cam surface adapted to be detachably engaged by a mechanism in the spindle for securing the arbor to the spindle, said first member having an aperture extending axially therethrough and an internal helical cam surface intermediate the ends of said aperture, and a second member disposed in said aperture and having a helical cam surface which mates with said helical cam surface of said first member and which surfaces provide for axial adjustment of said second member in said aperture, said second member further having a tool abutting portion at one end thereof engageable with a tool positioned in the end of said aperture opening into said tool attachable end of said first member and means at its other end engageable by a driving tool inserted from said spindle attaching end of said first member to adjust said second member in said aperture.

2. A tool arbor adapted to be secured to a tool spindle of a machine, said tool arbor comprising a first member having a tool attachable end adapted to support a tool end and a spindle attaching end adapted to be connected to a tool spindle of a machine, said spindle attaching end of said first member having an external cam surface adapted to be detachably engaged by a mechanism within the spindle for securing the arbor to the spindle, said first member having an aperture extending axially therethrough and internal threads intermediate the ends thereof, and a second member disposed in said aperture and having external threads which mate with said internal threads in said aperture and which threads provide for axial adjustment of said second member in said aperture upon relative rotation of said first and second members, said second member further having a tool abutting portion at one end thereof engageable with a tool positioned in the end of said aperture opening into said tool attachable end and means at its other end engageable by a driving tool inserted from said spindle attaching end of said first member to adjust said second member in said aperture.

3. A tool arbor adapted to be secured to a tool spindle of a machine, said tool arbor comprising a body member having a tool attachable end adapted to support a tool and a spindle attaching end adapted to be connected to a tool spindle of a machine, a connector member detachably connected to said spindle attaching end of said body member and having an axially extending, elongated portion provided with a surface engageable by a mechanism within the spindle for securing the arbor to the spindle, an aperture extending axially through said body member and said connector member, an internal helical cam surface on one of said members intermediate the ends of said aperture and an adjustable abutment member disposed in said aperture and having an external helical cam surface which mates with said internal helical cam surface and which surfaces provide for axial adjustment of said abutment member in said aperture, said abutment member further having a tool abutting portion at one end thereof which is engageable with the tool when the tool is positioned in the aperture in said tool attaching end and means at its other end engageable by a driving tool inserted from said spindle attaching end to adjust said abutment member in said aperture.

4. A tool arbor adapted to be secured to a tool spindle of a machine, said tool arbor comprising a body member having a tool attachable end adapted to support a tool and a spindle attaching end adapted to be connected to a tool spindle of a machine, said body member having an aperture extending axially therethrough and internal threads at the spindle attaching end portion and an internal helical cam surface intermediate the ends of said aperture, a connector member having an aperture extending therethrough and external threads at one end engaged with said internal threads at said spindle attaching end of said body member to secure said connector member to said body member, said connector member having an axially extending portion at its end opposite said external threads and provided with an external cam surface engageable with a mechanism within the tool spindle for detachably securing the arbor to the spindle, and an adjustable abutment member disposed in said aperture of said body member and having an external helical cam surface which mates with said internal helical cam surface of said body member and which surfaces provide for axial adjustment of said abutment member in said aperture of said body member, said abutment member further having a tool abutting portion at one end thereof which is engageable with a tool positioned in the end of said aperture in said body member opening into said tool attaching end and means at its other end engageable by a driving tool inserted through said connector member to adjust said abutment member in said aperture of said body member.

5. In a tool arbor including an arbor body having a tool attachable end adapted to support a tool and a spindle attaching end adapted to be connected to a tool spindle of a machine, the arbor body having an aperture extending axially therethrough adapted to receive an adjustable abutment member engageable with a tool positioned in the end of the aperture opening on the tool attachable end of the arbor body, the improvement characterized by a connector member for securing the arbor body to the spindle of a machine, said connector member having means at one end thereof for detachably connecting said member to the spindle attaching end of an arbor body, means at the opposite end thereof adapted to be engaged by a draw back mechanism within a tool spindle, and an unobstructed aperture extending axially through said member from said one end to said opposite end, said aperture of said member being alignable with and forming an extension of the aperture of the arbor body when said member is connected to said body, and said aperture of said member being formed to permit a driving tool to be inserted through said member into engagement with an adjustable abutment member mounted in the aperture of the arbor body.

References Cited
UNITED STATES PATENTS

| | | | |
|---|---|---|---|
| 1,839,569 | 1/1932 | Lovejoy | 90—11.1 XR |
| 3,023,675 | 3/1962 | Stephan | 90—11.1 |
| 3,242,819 | 3/1966 | Erikson | 90—11.1 |

LEONIDAS VLACHOS, *Primary Examiner.*